United States Patent [19]
Adams et al.

[11] 3,872,038
[45] Mar. 18, 1975

[54] AQUEOUS BASED RELEASE COMPOSITION

[75] Inventors: William Kiger Adams; James Alan Anderson, both of Tecumseh, Mich.

[73] Assignee: Stauffer Chemical Company, Westport, Conn.

[22] Filed: Dec. 3, 1973

[21] Appl. No.: 420,818

[52] U.S. Cl............. 260/13, 106/38.22, 106/38.23, 260/29.1 SI
[51] Int. Cl............................................ C08g 47/02
[58] Field of Search ........ 106/38.23, 38.22; 260/13, 260/29.2 M

[56] References Cited
UNITED STATES PATENTS

| | | | |
|---|---|---|---|
| 3,634,285 | 1/1972 | Brooks | 252/312 |
| 3,684,756 | 8/1972 | Brooks | 260/29.1 SI |
| 3,713,851 | 1/1973 | Cekada | 106/38.22 |

*Primary Examiner*—Harold D. Anderson
*Assistant Examiner*—E. A. Nielsen

[57] ABSTRACT

An aqueous release composition comprising a silicone emulsion, lubricant and a filler. The composition is useful as a release agent, especially in the manufacturing of tires.

10 Claims, No Drawings

AQUEOUS BASED RELEASE COMPOSITION

The invention relates to a release composition, particularly an aqueous release composition containing a silicone emulsion, and more particularly a composition containing a silicone emulsion, a lubricant and a filler.

Heretofore, solvent based release compositions have been used as release agents in molding plastics and other materials. Generally they are applied to the mold surface prior to the introduction of the plastic or other material to be molded or shaped. For example, in manufacturing tires, a rubber bag is inflated on the inside of a green tire carcass to force the carcass to assume the shape of the mold. After vulcanization is complete, the bag is deflated and removed therefrom. Generally, solvent based silicone release compositions have been applied to the inside of the carcass to provide for suitable lubrication between the bag surface and the inside surface of the carcass during bag inflation and to provide for proper release of the bag surface from the inside surface of the cured tire without defects. One of the problems encountered in using solvent based silicone release compositions is the large amount of solvent that is released during application, thus causing health and fire hazards.

In a solvent based release composition, it was found that silicone gums are essential in order to properly tackify the filler so that the bulk of the filler adheres to the vulcanized tire instead of the bag. Moreover, the silicone gums are essential in order to prevent the filler from falling to the bottom of the mold. If the above occurs, defective tires are produced. It has been proposed that an aqueous release composition be substituted for the solvent based release compositions used heretofore. However, it has been found that satisfactory aqueous release compositions could not be prepared which contained silicone gums.

Therefore, it is an object of this invention to provide a composition having improved release properties. Another object of this invention is to provide a composition which will give greater release efficiency. Still another object of this invention is to provide a composition which has improved stability over a prolonged period of time. A further object of this invention is to provide a composition which may be used as a release agent in manufacturing tires without producing a large volume of solvent vapors during the application of the release agent to the green carcass. A still further object of this invention is to provide an aqueous release composition which contains silicone gum.

The foregoing objects and others which will become apparent from the following description, are accomplished in accordance with this invention, generally speaking, by providing a release composition comprising (A) silicone emulsion which is present in an amount to provide from 2 to 25 percent by weight of silicone in the release composition; (B) from 20 to 60 percent by weight of a filler having a particle size of from about 100 to 600 mesh; (C) from 0.1 to 5.0 percent by weight of a dispersing agent; (D) from 0 to 25 percent by weight of a lubricant; (E) from 0.02 to 1.5 percent by weight of a suspending agent and (F) at least 20 percent by weight of water based on the weight of the release composition.

In order to prepare a suitable release composition it was found necessary to incorporate a silicone gum in the silicone emulsion (A) above. This was achieved by first forming a silicone solvent dispersion by mixing (1) an organopolysiloxane fluid having recurring structural units of the formula

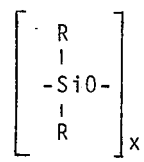

and (2) a silicone gum in a weight ratio of gum to organopolysiloxane fluid of from 1:3 to 1:25 with sufficient organic solvent to provide a solvent dispersion having a viscosity of from 10,000 to 100,000 cps. at 25°C.

The radicals represented by R which may be the same or different are monovalent hydrocarbon radicals or halogenated monovalent hydrocarbon radicals having from 1 to 18 carbon atoms and x is a number greater than 20.

Radicals represented by R above are alkyl radicals, e.g., methyl, ethyl, propyl, butyl, octyl, dodecyl, and octadecyl; aryl radicals, e.g., phenyl, diphenyl and naphthyl radicals; alkenyl radicals, e.g., vinyl and allyl radicals; cycloalkyl radicals, e.g., cyclobutyl, cyclopentyl and cyclohexyl; alkaryl radicals, e.g., tolyl, xylyl, ethylphenyl; aralkyl radicals, e.g., benzyl, α-phenylethyl, 4 B-phenylethyl and α-phenylbutyl; and the halo substituted radicals enumerated above.

The organopolysiloxane fluid may be any linear or branched chained compound having an average of from 1.75 to 2.25 organic radicals per silicon atom. In addition to the structural units shown above, the organopolysiloxane may also contain units which correspond to the following empirical formulae $SiO_{4/2}$, $RSiO_{3/2}$, and $R_3SiO_{1/2}$ where R is the same as above. Generally, it is preferred that the organopolysiloxane be free of terminal hydroxyl groups; however, a small number of terminal hydroxyl groups will not materially affect the release properties of the composition. The organopolysiloxane may have a minor amount of molecules having only one hydroxyl group or there may be a small number of molecules carrying an excess of two hydroxyl groups; however, as mentioned previously it is preferred that the organopolysiloxane be substantially free of hydroxyl groups. In general the organopolysiloxane fluid should have an average viscosity of between about 100 and 100,000 cps., and more preferably between about 10,000 and 80,000 cps., at 25°C. Optimum results have been obtained in the lower portion of these ranges such as from about 30,000 to 60,000 centipoise. In addition, it is possible to combine high and low viscosity fluids to form a fluid having the desired viscosity range.

The release composition of this invention may contain up to about 25 percent by weight of silicone, preferably from about 2 to about 20 percent and more preferably from about 5 to 15 percent by weight based on the weight of the release composition.

The silicone gums are well known materials having the general formula $R_nSiO_{4-n/2}$ wherein R has the same meaning as above and n has a value of from 1.9 to 2.1.

These silicone gums have been available commercially for years. Many methods of preparation of such materials are known and are adequately documented in the literature. These silicone gums can be either homopolymeric or copolymeric materials containing two or more different siloxane units, and the organic radicals attached to any one silicon atom can be the same or the radicals attached to any one silicon atom can be different. Mixtures of polymers can of course also be used, if desired. Preferably at least 75 molar percent of the silicon atoms present in the silicone gum are substituted with alkyl radicals, among which the methyl radicals provide the most outstanding products. Any radicals present other than the methyl radicals are most preferably vinyl and/or phenyl radicals. Generally these gums will have an R/Si ratio of from about 1.9 to 2.1 organic groups per silicon atom and a plasticity value of from 80 to 120 millimeters as measured by the parallel plate plastometer test described in A.S.T.M. Test D926-67.

Lubricants which may be used in this invention are polyglycols which have an average molecular weight of from about 400 up to about 4,000 and more preferably from about 2,000 to 3,000. The polyglycols can be either homopolymers of ethylene or propylene glycols or copolymers of the two. The amount of polyglycol present in this composition is not critical and may range from about 0 to 25 percent and more preferably from about 1 to 15 percent by weight based on the weight of the composition. Other lubricants which may be used are castor oil, stearates and the like.

The fillers which may be employed in this composition should have a particle size within the range of from about 100 to 600 and more preferably from about 160 to 400 mesh. Examples of suitable fillers are those which contain graphite, carbon black and silicates, such as mica, synthetic mica, alkaline earth metal silicates, aluminum silicates, vermiculite, talc, kaolin and mixtures thereof. It is preferred that mica be used as the filler in the release composition, since it imparts lubricity, release properties and provides channels through which entrapped air can escape.

The amount of filler which may be used in this composition may range from 20 to 60 percent and more preferably from about 20 to 50 percent based on the weight of the release composition.

Various emulsifying agents may be employed in this composition to enhance the formation and/or to promote the stability of the emulsion. Examples of suitable emulsifying agents are nonionic emulsifiers such as polyoxyethylene alkyl phenols, nonylphenoxypoly (ethyleneoxy) ethanols (available from General Aniline and Film Corporation), polyoxyethylene sorbitol hexastearate, polyoxyethylene (2 mole) cetyl ether (available from Imperial Chemical Industries of America), trimethyl nonyl ether of polyethylene glycol (molecular weight about 626) and containing from 6 to 14 ethylene oxide radicals per molecule (available as TERGITOL TMN-10 from Union Carbide Corporation), polyoxyethylene sorbitol oleate (saponification number 102–108 and hydroxyl number 25–35, available as ATLOX 1087 from Imperial Chemical Industries of America). Examples of suitable anionic emulsifying agents which may be used are sodium alkyl aryl polyether sulfonate (available as TRITON X-202 from Rohm and Haas), a partial sodium salt of a phosphate ester of an ethylene oxide adduct of nonyl phenol containing from 4 to 10 ethylene oxide radicals per molecule (molecular weight about 1,112 and an acid number 7–8, available as GAFAC LO-529 from General Aniline and Film Corporation) and the like.

Even though the amount of emulsifying agent is not critical it is preferred that the weight ratio of emulsifying agent to silicone dispersion be in a ratio of from 1:10 to 1:25 and more preferably the weight ratio is from 1:12 to 1:20.

Dispersing agents which may be used in this invention are lecithin, alkyl aryl sulfonates (available as G-3300 from Imperial Chemical Industries of America), sodium salt of polymerized alkyl naphthalene sulfonic acid (available as DARVAN No. 1 from R.T. Vanderbilt), sodium triphosphate, and the anionic emulsifying agents described above and mixtures thereof.

The amount of dispersing agent may range from about 0.1 to about 5 percent and more preferably from about 0.3 to 3 percent by weight based on the weight of the release composition.

Several suspending agents may be added to the composition of this invention to aid in maintaining the fillers in suspension. Examples of suitable suspending agents are magnesium aluminum silicate (ATTAGEL), water-soluble cellulose such as sodium carboxymethylcellulose, sodium carboxymethylhydroxyethylcellulose, hydroxyethylcellulose, methylcellulose, methylhydroxypropylcellulose, ethylhydroxyethylcellulose, methylethylcellulose, methylhydroxyethylcellulose, bentonite clay, and the like.

Although the amount of suspending agents employed in this composition is not critical, it is preferred that the composition contain from 0.02 to 1.5 percent by weight and more preferably from 0.05 to 1 percent by weight based on the weight of the release composition.

Any hydrocarbon solvent which is a solvent for the silicone gum may be used in the preparation of the silicone dispersion. Examples of suitable solvents are cycloparaffins such as cyclohexane, aliphatic hydrocarbons, e.g., hexane, kerosene, hexadecane, mineral spirits, odorless mineral spirits or aromatic hydrocarbons, e.g., benzene, toluene, xylene and chlorinated derivatives thereof. Examples of suitable chlorinated hydrocarbon solvents are trichloroethylene, trichloroethane, trichloromethane, tetrachloromethane, tetrachloroethylene and the like. The amount of solvent used to disperse the organopolysiloxane fluid and silicone gum should be sufficient to provide a dispersion viscosity of from 10,000 to 100,000 cps. and more preferably from about 40,000 to 60,000 cps. at 25°C.

Other ingredients such as preservatives, e.g., formaldehyde and 6-acetoxy-2,4-dimethyl-m-dioxane- (available as GIV-GARD DXN from Givaudan), antifoams, rust inhibitors such as sodium nitrite, sodium nitrate, coloring agents and the like can be added in minor amounts to the composition of this invention.

Although the silicone solvent dispersion may be prepared by several different techniques in a mechanical mixing apparatus, it is preferred that the silicone gum and the organopolysiloxane fluid be added to a sufficient amount of organic solvent with agitation to form a dispersion having a viscosity of from 10,000 to 100,000 cps. at 25°C.

The dispersion prepared above is then added to a mechanical mixing apparatus containing emulsifying agents and a predetermined amount of water, the amount of water being equal to or less than the total weight of the emulsifying agents, to form a paste-like or dry grease composition. A sufficient amount of water is then added to invert the paste-like composition from a water-in-oil to an oil-in-water emulsion.

The release compositions of this invention are then prepared by adding the silicone emulsion prepared above to a mechanical mixing apparatus containing water, suspending agent, lubricant, dispersing agent, such as lecithin, filler, such as mica and other additives, such as preservatives and antifoams and agitated for about 15 minutes at a temperature below about 35°C.

The release compositions described above may be used as release agents in molding rubber and plastic articles. These compositions exhibit excellent release properties when employed as release agents in tire manufacturing.

The embodiments of this invention are further illustrated by the following examples in which all parts are by weight unless otherwise specified.

EXAMPLE 1

Preparation of Silicone Solvent Dispersion (A) To a mixer containing about 63 parts of mineral spirits are added about 23 parts of silicone gum having a plasticity value of from 95 to 100 millimeters and about 152 parts of a dimethylpolysiloxane fluid having a viscosity of about 60,000 cps. at 25°C. and about 3.6 parts of a dimethylpolysiloxane fluid having a viscosity of about 350 cps. at 25°C. The ingredients are agitated until the silicone fluid and gum are completely dispersed.

Preparation of Silicone Emulsion

B. About 126 parts of the dispersion (A) prepared above are added to a mixer containing 6.7 parts of nonylphenoxypoly (ethyleneoxy) ethanol containing 80 weight percent ethylene oxide (available as IGEPAL CO-850 from General Aniline and Film Corporation) and 2.2 parts of nonylphenoxypoly (ethyleneoxy) ethanol containing 54 weight percent ethylene oxide (available as IGEPAL CO-530 from General Aniline and Film Corporation), and 3.7 parts of water with agitation to form a water-in-oil emulsion having a paste-like consistency. Then about 66 parts of water are added slowly with agitation to invert the water-in-oil emulsion to an oil- in-water emulsion.

EXAMPLE 2

Preparation of Silicone Release Composition

The release composition is prepared by mixing the ingredients in the following order:
246 parts water
1 part sodium carboxymethylcellulose
6 parts lecithin
84 parts polyglycol-copolymer of ethylene and propylene glycol in amount of about 50 percent by weight of each, said copolymer having a molecular weight of 2600
92 parts silicone emulsion — Example 1(B)
310 parts mica (325 mesh)

The ingredients are mixed for a sufficient amount of time to provide a homogeneous dispersion at a temperature below about 35°C. and filtered.

When this composition is sprayed onto green tire carcasses, it exhibits excellent release properties.

EXAMPLE 3

Preparation of Silicone Solvent Dispersion

A. The procedure of Example 1(A) is repeated except that 56 parts of dimethylpolysiloxane fluid having a viscosity of 350 cps. at 25°C. is substituted for the 3.6 parts of dimethylpolysiloxane fluid.

Preparation of Silicone Emulsion

B. A silicone emulsion is prepared in accordance with Example 1(B) except that 126 parts of the silicone dispersion prepared in Example 3(A) is substituted for the silicone dispersion of Example 1(A).

Preparation of Silicone Release Composition

C. The release composition is prepared by adding the following ingredients in the order specified.
412 parts water
2 parts sodium carboxymethylcellulose
3 parts antifoam (SWS-214 available from SWS Silicones, Division of Stauffer Chemical Company)
12 parts lecithin
67 parts polyglycol-polypropylene glycol having a molecular weight of 2,250
234 parts silicone emulsion Example 3(B)
615 parts mica (325 mesh)

The ingredients are mixed for sufficient time to provide a homogeneous dispersion at a temperature below about 35°C. and filtered.

When this composition is sprayed onto green tire carcasses, it exhibits excellent release properties.

EXAMPLE 4

Preparation of Silicone Release Composition

A release composition is prepared by mixing the ingredients in the following order:
407 parts water
2 parts sodium carboxymethylcellulose
9 parts lecithin
210 parts polyglycol-copolymer of ethylene and propylene glycol in amount of 50 percent by weight of each, said copolymer having a molecular weight of 2600
3 parts of antifoam (available as SWS-214 from SWS Silicones, Division of Stauffer Chemical Company)
258 parts of silicone emulsion Example 3(B)
455 parts mica (325 mesh)

The ingredients are mixed for a sufficient time to provide a homogeneous dispersion at a temperature below about 35°C. and filtered.

This composition exhibits excellent release properties when employed in the molding of green tire carcasses.

EXAMPLE 5

Preparation of Silicone Release Composition

A release composition is prepared by mixing the ingredients in the following order:
1,100 parts water
5 parts sodium carboxymethylcellulose
12 parts lecithin
67 parts polyglycol-copolymer of ethylene and propylene glycol in amount of 50 percent by weight of each, said copolymer having a molecular weight of 2600
3 parts antifoam (available as SWS-214 from SWS Silicones, Division of Stauffer Chemical Company)
234 parts silicone emulsion Example 3(B)
615 parts mica (325 mesh)

The ingredients are mixed for a sufficient time to provide homogeneous dispersion at a temperature below about 35°C. and filtered.

This composition exhibits excellent release properties when employed in the molding of green tire carcasses.

EXAMPLE 6

A release composition is prepared in accordance with Example 2 except that 6 parts of a partial sodium salt of a phosphate ester of an ethylene oxide adduct of nonyl phenol containing from 4 to 10 ethylene oxide radicals per molecule (molecular weight about 1,112 and an acid number of 7 to 8, available as GAFAC LO-529 from General Aniline and Film Corporation) is substituted for lecithin.

This composition exhibits excellent release properties when employed in the molding of green tire carcasses.

EXAMPLE 7

Preparation of Silicone Solvent Dispersion

A About 45 parts of a silicone gum having a plasticity value of from 95 to 105 millimeters is added to 99 parts of mineral spirits in a mechanical mixer with agitation. About 249 parts of a dimethylpolysiloxane fluid having a viscosity of about 60,000 cps. at 25°C. and about 5 parts of a dimethylpolysiloxane having a viscosity of 350 cps. at 25°C. are added with agitation. The resulting dispersion has a viscosity of about 57,000 cps. at 25°C.

Preparation of Silicone Emulsion

B. About 140 parts of the dispersion prepared above are added to a mechanical mixer containing about 5 parts of water, 8 parts of trimethyl nonyl ether of polyethylene glycol containing from 6 to 14 ethylene oxide radicals per molecule (available as TERGTOL TMN-10 from Union Carbide Corporation), 2 parts of a partial sodium salt of a phosphate ester of an ethylene oxide adduct of nonyl phenol containing 6 to 10 ethylene oxide radicals per molecule and having a molecular weight of about 1,112 (available as GAFAC LO-529 from General Aniline and Film Corporation), 2 parts of polyoxyethylene sorbitol oleate (available as ATLOX 1087 from Atlas Chemical Industries, Inc.) with agitation. After mixing for about 10 minutes, an additional 78 parts of water are then added with agitation.

Preparation of Silicone Release Composition

C. The emulsion prepared in Example 7(B) is used in the preparation of the following release composition in which the ingredients are mixed in the following order:
62.0 parts water
0.2 part sodium carboxymethylcellulose
0.4 part antifoam (SWS-214 available from SWS Silicones, Division of Stauffer Chemical Company)
1.6 parts lecithin
22.0 parts polyglycol-copolymer of ethylene and propylene glycol in an amount of about 50 percent by weight of each, said copolymer having a molecular weight of 2600
24.0 parts silicone emulsion-Example 7(B)
80.0 parts mica (325 mesh)

The ingredients are mixed for a sufficient time to provide a homogeneous dispersion at a temperature below about 35°C. and filtered.

A centrifuged sample of this material showed substantially no evidence of free oil on its surface. Even after standing for several weeks, no free oil is observed.

This formulation provided excellent release properties when used in the molding of green tire carcasses.

EXAMPLE 8

Preparation of Silicone Solvent Dispersion

A. In a comparison example, about 45 parts of a silicone gum having a plasticity value of from 95 to 105 is added to a mechanical mixer containing 249 parts of a dimethylpolysiloxane fluid having a viscosity of 60,000 cps. at 25°C. and 5 parts of a dimethylpolysiloxane fluid having a viscosity of 350 cps. at 25°C. The resulting dispersion has a viscosity between 250,000 and 350,000 cps. at 25°C.

Preparation of Silicone Emulsion

B. The procedure of Example 7(B) is repeated except that the dispersion of Example 8(A) is substituted for the dispersion of Example 7(A).

Preparation of Silicone Release Composition

C. The emulsion prepared in Example 8(B) is used in the preparation of the following release composition. The ingredients are mixed in the order specified:
68.0 parts water
0.2 part sodium carboxymethylcellulose
0.4 part antifoam (SWS-214 available from SWS Silicones, Division of Stauffer Chemical Company)
2.0 parts lecithin
22.0 parts polyglycol-copolymer of ethylene and propylene glycol in an amount of 50 percent by weight of each, said copolymer having a molecular weight of about 2600
18.0 parts silicone emulsion-Example 8(B)
80.0 parts mica (325 mesh)

The ingredients are mixed for sufficient time to provide a homogeneous dispersion at a temperature below about 35°C. and filtered.

A centrifuged sample of this material contained 2 percent silicone oil on its surface.

Green tire carcasses, sprayed with this formulation resulted in defects due to flaking and poor parting of the bag from the cured tires.

EXAMPLE 9

Preparation of Silicone Emulsion

A. In a comparison example, about 95 parts of a dimethylpolysiloxane fluid having a viscosity of about 60,000 cps. at 25°C. are added to a mixer containing 6.7 parts of a nonylphenoxypoly (ethyleneoxy) ethanol (available as IGELPAL CO-850 from General Aniline and Film Corporation), and 2.2 parts of nonylphenoxypoly (ethyleneoxy) ethanol (available as IGEPAL CO-530 from General Aniline and Film Corporation), and 3 parts of water with agitation to form a paste-like material. Then slowly add about 103 parts of water with agitation and continue to agitate for about 10 minutes to form a silicone fluid emulsion.

Preparation of Silicone Release Composition

B. The release composition is prepared by mixing the ingredients in the following order:
447 parts water
2 parts sodium carboxymethylcellulose 12 parts lecithin
154 parts polyglycol-copolymer of ethylene and propylene glycol in amount of 50 percent by weight of each, said copolymer having a molecular weight of 2600
168 parts silicone emulsion-Example 9(A)
565 parts mica The ingredients are mixed for about 15 minutes at a temperature below about 35°C. and filtered.

A centrifuged sample of this material showed substantially no evidence of free oil on its surface.

When this composition is used in molding green tire carcasses, flaking off of the release agent was observed which resulted in the production of defective tires.

Although specific examples of the invention have been described herein, it is not intended to limit the invention solely thereto, but to include all the variations and modifications falling within the spirit and scope of the appended claims.

What is claimed is:

1. A release composition comprising
   A silicone emulsion in an amount to provide from 2 to 25 percent by weight of silicone in said release composition,
   B from 0.1 to 5 percent by weight of a dispersing agent,
   C from 0 to 25 percent by weight of a lubricant,
   D from 20 to 60 percent by weight of a filler,
   E from 0.02 to 1.5 percent by weight of a suspending agent, and
   F at least 20 percent by weight of water based on the weight of the release composition, said silicone emulsion is obtained by (1) mixing an organopolysiloxane fluid having recurring units of the formula

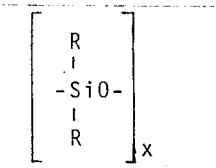

wherein R, which may be the same or different, is selected from the group consisting of monovalent hydrocarbon radicals and halogenated monovalent hydrocarbon radicals and $x$ is a number greater than 20, and a silicone gum having a plasticity value of from 80 to 120 millimeters with sufficient organic solvent to form a silicone solvent dispersion having an average viscosity of from 10,000 to 100,000 cps. at 25°C., said silicone gum to organopolysiloxane fluid being in a weight ratio of from 1:3 to 1:25, (2) adding said silicone dispersion to a mixture containing an emulsifying agent and sufficient water to form a water-in-oil emulsion having a paste-like consistency, said emulsifying agent and silicone dispersion being in a weight ratio of from 1:10 to 1:25 and thereafter (3) adding with agitation sufficient water to invert the water-in-oil emulsion to an oil-in-water emulsion.

2. The composition of claim 1 wherein the organopolysiloxane fluid used in the preparation of the silicone dispersion is dimethylpolysiloxane.

3. The composition of claim 1 wherein the filler is mica.

4. The composition of claim 1 wherein the lubricant is a polyglycol copolymer of ethylene and propylene glycol.

5. The composition of claim 1 wherein the suspending agent is sodium carboxymethylcellulose.

6. The composition of claim 1 wherein the release composition contains from 20 to 50 percent by weight of mica, 5 to 15 percent by weight of a polyglycol, 0.05 to 1 percent by weight of a suspending agent, 0.3 to 3 percent by weight of lecithin, a sufficient amount of silicone emulsion to provide from 5 to 18 percent by weight of silicone in said release composition, and the remainder of the composition being water.

7. The composition of claim 1 wherein the release composition contains 41 percent by weight of mica, 1 percent by weight of lecithin, 11 percent by weight of a polyglycol, 0.2 percent by weight of a suspending agent, a sufficient amount of silicone emulsion to provide a 5.5 percent by weight of silicone based on the weight of the release composition and the remainder of the composition being water.

8. The composition of claim 1 wherein the silicone gum has a plasticity value of from 95 to 105 and is present in the silicone dispersion in a weight ratio of silicone gum to organopolysiloxane fluid of 1:7.

9. A method for preparing an aqueous release composition which comprises adding a silicone gum having a plasticity value of from 80 to 120 millimeters to an organic solvent with agitation, adding an organopolysiloxane fluid having recurring structural units of the formula

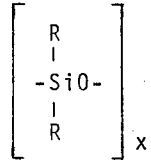

wherein R which may be the same or different is selected from the group consisting of monovalent hydrocarbon radicals, halogenated monovalent hydrocarbon radicals and $x$ is a number greater than 20, said silicone gum being present in a weight ratio of gum to organopolysiloxane fluid of from 1:3 to 1:25, adding additional solvent to form a silicone solvent dispersion having a viscosity of from 10,000 to 100,000 cps. at 25°C., adding the silicone dispersion to a mixture containing an emulsifying agent and sufficient water to form a paste-like water-in-oil emulsion, said emulsifying agent and silicone dispersion being in a weight ratio of 1:10 to 1:25, adding sufficient water to invert the paste-like water-in-oil emulsion to an oil-in-water emulsion, then adding the thus formed emulsion to a mixture containing 0.02 to 1.5 percent by weight of a suspending agent, 0 to 25 percent by weight of a lubricant, 0.1 to 5.0 percent by weight of a dispersing agent and thereafter adding from 20 to 60 percent by weight of a filler having a particle size of from 100 to 600 mesh.

10. The method of claim 9 wherein the silicone gum has the unit formula $R_nSiO_{4-n/2}$ in which R is selected from the group consisting of a monovalent hydrocarbon radical and a halogenated monovalent hydrocarbon radical having from 1 to 18 carbon atoms and n has a value of from 1.9 to 2.1.

* * * * *